UNITED STATES PATENT OFFICE.

ROBERT H. MARTIN, OF BROOKLYN, NEW YORK.

PLASTIC CEMENT MIXTURE.

SPECIFICATION forming part of Letters Patent No. 276,697, dated May 1, 1883.

Application filed February 27, 1883. (No specimens.)

*To all whom it may concern:*

Be it known that I, ROBERT H. MARTIN, of the city of Brooklyn, in the county of Kings and State of New York, have invented new and useful Improvements in Plastic Cement Mixtures for various purposes, and especially where such mixtures are to be used as non-conductors of heat; and I hereby declare that the following is a specification thereof.

As is well known, confined-air spaces constitute the best known non-conductors, and, in fact, the proportionate value of what are known as "non-conductors," as a rule, is determined by the number and extent of air-spaces or interstices contained in the material employed. It is highly desirable, in non-conducting coverings for hot pipes, furnaces, boilers, &c., to have them composed of or protected by non-combustible material to prevent their speedy destruction. I have discovered that what is known as "infusoria," or "infusorial earth," so called, has valuable properties as a non-conductor by reason of its peculiar structure and composition. The microscopic creatures which compose it, when found in deposits of the so-called "earth," being dead, appear like minute shells, each one of which contains or constitutes an air-cell. The so-called "earth" is very light, and for that reason more desirable than any other material used in plastic non-conductors, and will withstand a very high degree of heat.

My covering may be made by the admixture of asbestus fiber with the infusorial earth in a cement, the asbestus serving both as a binder to increase the strength of the plastic cement and as an aid in resisting the effects of the heat upon the material employed. I do not confine myself to asbestus alone, as, while it serves the two purposes stated as a binder, though in my judgment less advantageously, other kinds of fiber may be used successfully. This mixture, as in the other case, may be applied as a plastic cement directly upon the hot surfaces, or upon nettings or other frames about such surfaces, or may be cast or molded into sections adapted in shape and size to the surfaces to be covered, and to be bound or fastened thereon in any usual manner.

This plastic cement can be combined with an asbestus or other sheathing interposed between it and the hot surface, or with a covering of any suitable material on the outside. It may be applied in layers with sheets of asbestus, hair, or other material suitable to be used.

This cement, in any of the mixtures described, may be advantageously employed in making buildings or structures fire-proof by using it in filling in between walls and floors and applying to iron columns and iron-work generally, either in its plastic or molded forms.

In some cases it will be found desirable to use silicate of soda, or some other similar adhesive material, in the mixture to insure the strength necessary to meet the particular case.

I am aware that infusorial earth has been used as a filling for safes, and that it has been proposed to use it in connection with sulphuric acid, fire-clay, asbestus, powdered silica, and feldspar as a fire-proof material; but such I do not claim.

Having described my invention, what I desire to claim as new is—

1. A plastic cement for non-conducting coverings, composed of infusorial earth and asbestus fiber.

2. A non-conducting covering composed of a cement made of a mixture of infusorial earth and asbestus fiber cast or molded into sections adapted for and to be bound upon or applied to the surface to be covered.

ROBERT H. MARTIN.

Witnesses:
WILLIAM A. BARR,
JAMES DEMAREST.